United States Patent
Park et al.

(10) Patent No.: US 7,477,581 B2
(45) Date of Patent: Jan. 13, 2009

(54) DEFECT MANAGEMENT METHOD FOR OPTICAL RECORDING MEDIUM AND OPTICAL RECORDING MEDIUM USING THE SAME

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 520 days.

(21) Appl. No.: 10/784,270

(22) Filed: Feb. 24, 2004

(65) Prior Publication Data

US 2005/0018563 A1 Jan. 27, 2005

(30) Foreign Application Priority Data

Feb. 25, 2003 (KR) .................. 10-2003-0011831
Apr. 15, 2003 (KR) .................. 10-2003-0023839

(51) Int. Cl.
*G11B 7/00* (2006.01)
(52) U.S. Cl. .................. 369/53.17; 369/47.14
(58) Field of Classification Search ............. 369/47.14, 369/53.17
See application file for complete search history.

(56) References Cited

U.S. PATENT DOCUMENTS

| | | |
|---|---|---|
| 4,558,446 A | 12/1985 | Banba et al. |
| 4,733,386 A | 3/1988 | Shimoi et al. |
| 4,807,205 A | 2/1989 | Picard et al. |
| 4,963,866 A | 10/1990 | Duncan |
| 5,068,842 A | 11/1991 | Naito et al. |
| 5,111,444 A | 5/1992 | Fukushima et al. |
| 5,210,734 A | 5/1993 | Sakurai et al. |
| 5,235,585 A | 8/1993 | Bish et al. |
| 5,237,553 A | 8/1993 | Fukushima et al. |
| 5,247,494 A | 9/1993 | Ohno et al. |
| 5,319,626 A | 6/1994 | Ozaki et al. |
| 5,404,357 A | 4/1995 | Ito et al. |
| 5,442,611 A | 8/1995 | Hosaka et al. |
| 5,448,728 A | 9/1995 | Takano et al. |
| 5,475,820 A | 12/1995 | Natrasevschi et al. |
| 5,481,519 A | 1/1996 | Hosoya et al. |

(Continued)

FOREIGN PATENT DOCUMENTS

CN 1134017 A 10/1996

(Continued)

OTHER PUBLICATIONS

JIS handbook data processing for hardware, Japan, Japanese Standards Association Inc., Apr. 21, 1999, pp. 1064-1070.

*Primary Examiner*—Wayne R Young
*Assistant Examiner*—LaTanya Bibbins
(74) *Attorney, Agent, or Firm*—Birch, Stewart, Kolasch & Birch, LLP

(57) ABSTRACT

A method and an optical recoding medium for defect management are discussed. According to an embodiment, the method of defect management for a write-once optical recording medium having a plurality of temporary defect management areas, includes a step of recording disc definition structure information in one of the plurality of temporary defect management areas, wherein the plurality of temporary defect management areas include a first temporary defect management area for recording the disc definition structure information during a recording session and a second temporary defect management area for recording the disc definition structure information upon termination of the recording session.

6 Claims, 5 Drawing Sheets

U.S. PATENT DOCUMENTS

| | | |
|---|---|---|
| 5,495,466 A | 2/1996 | Dohmeier et al. |
| 5,528,571 A | 6/1996 | Funahashi et al. |
| 5,553,045 A | 9/1996 | Obata et al. |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori et al. |
| 5,802,028 A | 9/1998 | Igarashi et al. |
| 5,805,536 A | 9/1998 | Gage et al. |
| 5,848,038 A | 12/1998 | Igarashi et al. |
| 5,867,455 A | 2/1999 | Miyamoto et al. |
| 5,878,020 A | 3/1999 | Takahashi |
| 5,914,928 A | 6/1999 | Takahashi et al. |
| 5,940,702 A | 8/1999 | Sakao et al. |
| 6,058,085 A | 5/2000 | Obata et al. |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 * | 2/2001 | Sasaki et al. ................. 714/710 |
| 6,233,654 B1 | 5/2001 | Aoki et al. |
| 6,292,445 B1 | 9/2001 | Ito et al. |
| 6,341,109 B1 | 1/2002 | Kayanuma et al. |
| 6,341,278 B1 | 1/2002 | Yamamoto et al. |
| 6,373,800 B1 | 4/2002 | Takahashi et al. |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko et al. |
| 6,469,978 B1 | 10/2002 | Ohata et al. |
| 6,477,126 B1 | 11/2002 | Park et al. |
| 6,480,446 B1 | 11/2002 | Ko et al. |
| 6,493,301 B1 | 12/2002 | Park et al. |
| 6,496,807 B1 | 12/2002 | Inokuchi et al. |
| 6,529,458 B1 | 3/2003 | Shin et al. |
| 6,542,450 B1 | 4/2003 | Park et al. |
| 6,564,345 B1 | 5/2003 | Kim et al. |
| 6,581,167 B1 | 6/2003 | Gotoh et al. |
| 6,606,285 B1 * | 8/2003 | Ijtsma et al. ................. 369/47.1 |
| 6,615,363 B1 | 9/2003 | Fukasawa et al. |
| 6,631,106 B1 | 10/2003 | Numata et al. |
| 6,633,724 B1 | 10/2003 | Hasegawa et al. |
| 6,667,939 B1 | 12/2003 | Miyamoto et al. |
| 6,671,249 B2 | 12/2003 | Horie et al. |
| 6,697,306 B2 | 2/2004 | Sako et al. |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 * | 6/2004 | Kim et al. .................... 714/723 |
| 6,760,288 B2 | 7/2004 | Ijtsma et al. |
| 6,763,429 B1 | 7/2004 | Hirayama et al. |
| 6,766,418 B1 | 7/2004 | Alexander et al. |
| 6,785,206 B1 | 8/2004 | Lee et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki et al. |
| 6,934,236 B2 | 8/2005 | Lee et al. |
| 6,999,398 B2 | 2/2006 | Yamamoto et al. |
| 7,002,882 B2 * | 2/2006 | Takahashi ................. 369/47.14 |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,349,301 B2 | 3/2008 | Terada et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0033537 A1 * | 10/2001 | Ko et al. ................... 369/53.35 |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 * | 7/2003 | Ueda et al. ................. 369/47.14 |
| 2003/0142608 A1 * | 7/2003 | Yamamoto et al. ....... 369/59.25 |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0105363 A1 * | 6/2004 | Ko et al. ................... 369/47.14 |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0223427 A1 | 11/2004 | Kim et al. |
| 2004/0246851 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |
| 2005/0195716 A1 | 9/2005 | Ko et al. |
| 2005/0207262 A1 | 9/2005 | Terada et al. |
| 2005/0289389 A1 | 12/2005 | Yamagami et al. |

| | | | |
|---|---|---|---|
| 2006/0077827 A1 | 4/2006 | Takahashi | |
| 2006/0195719 A1 | 8/2006 | Ueda et al. | |
| 2006/0203635 A1 | 9/2006 | Ko et al. | |
| 2006/0203638 A1 | 9/2006 | Ko et al. | |
| 2006/0203684 A1 | 9/2006 | Ko et al. | |
| 2006/0227694 A1 | 10/2006 | Woerlee et al. | |
| 2006/0233078 A1 | 10/2006 | Terada et al. | |
| 2007/0294571 A1 | 12/2007 | Park et al. | |
| 2008/0046780 A1 | 2/2008 | Shibuya et al. | |

FOREIGN PATENT DOCUMENTS

| | | |
|---|---|---|
| CN | 1140897 C | 1/1997 |
| CN | 1227950 A | 9/1999 |
| CN | 1273419 A | 11/2000 |
| CN | 1675708 A | 9/2005 |
| CN | 1685426 A | 10/2005 |
| DE | 199 54 054 A1 | 6/2000 |
| EP | 0314186 A2 | 5/1989 |
| EP | 0325823 A1 | 8/1989 |
| EP | 0350920 A2 | 1/1990 |
| EP | 0464811 A2 | 1/1992 |
| EP | 0472484 A2 | 2/1992 |
| EP | 0477503 A2 | 4/1992 |
| EP | 0556046 A1 | 8/1993 |
| EP | 0871172 A2 | 10/1998 |
| EP | 0908882 A2 | 4/1999 |
| EP | 0974967 A1 | 1/2000 |
| EP | 0989554 A1 | 3/2000 |
| EP | 0997904 A1 | 5/2000 |
| EP | 1026681 B1 | 8/2000 |
| EP | 1043723 A1 | 10/2000 |
| EP | 1132914 A2 | 9/2001 |
| EP | 1148493 A2 | 10/2001 |
| EP | 1 152 414 A2 | 11/2001 |
| EP | 1152414 A3 | 11/2001 |
| EP | 1239478 A1 | 9/2002 |
| EP | 1274081 A2 | 1/2003 |
| EP | 1298659 A1 | 4/2003 |
| EP | 1329888 A1 | 7/2003 |
| EP | 1347452 A2 | 9/2003 |
| EP | 1547065 | 6/2005 |
| EP | 1564740 A1 | 8/2005 |
| EP | 1573723 | 9/2005 |
| EP | 1612790 A1 | 1/2006 |
| EP | 1623422 | 2/2006 |
| GB | 2356735 A | 5/2001 |
| GB | 2356735 A | 1/2002 |
| JP | 63-091842 A | 4/1988 |
| JP | 01-263955 A | 10/1989 |
| JP | 02-023417 A | 1/1990 |
| JP | 05-274814 A | 10/1993 |
| JP | 06-349201 A | 12/1994 |
| JP | 08-096522 A | 4/1996 |
| JP | 09-145634 A | 6/1997 |
| JP | 09-231053 A | 9/1997 |
| JP | 10-050005 A | 2/1998 |
| JP | 10-050032 A | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 A1 | 7/1998 |
| JP | 11-110888 A | 4/1999 |
| JP | 11-203792 A | 7/1999 |
| JP | 2000-090588 A | 3/2000 |
| JP | 2000-149449 A | 5/2000 |
| JP | 2000-195178 A | 7/2000 |
| JP | 2000-215612 | 8/2000 |
| JP | 2000-285607 A | 10/2000 |
| JP | 2001-023317 A | 1/2001 |
| JP | 2001-069440 A | 3/2001 |
| JP | 2001-110168 A | 4/2001 |
| JP | 2001-351334 A | 12/2001 |
| JP | 2001-357623 A | 12/2001 |
| JP | 2002-015507 A | 1/2002 |
| JP | 2002-015525 A | 1/2002 |
| JP | 2002-056619 A | 2/2002 |
| JP | 2002-215612 A | 8/2002 |
| JP | 2002-245723 | 8/2002 |
| JP | 2002-245723 A | 8/2002 |
| JP | 2002-288938 A | 10/2002 |
| JP | 2002-329321 A | 11/2002 |
| JP | 2002-352522 A | 12/2002 |
| JP | 2003-536194 A | 12/2003 |
| JP | 2004-280864 A | 10/2004 |
| JP | 2004-280865 A | 10/2004 |
| JP | 2005-004912 A | 6/2005 |
| JP | 2005-535993 A | 11/2005 |
| JP | 2005-538490 A | 12/2005 |
| JP | 2005-538491 A | 12/2005 |
| JP | 2006-519445 A | 8/2006 |
| KR | 1020040094301 A | 11/2004 |
| RU | 2005 103 626 | 9/2005 |
| RU | 2005 127 337 | 2/2006 |
| TW | 371752 | 10/1999 |
| TW | 413805 | 12/2000 |
| WO | WO-84/00628 A1 | 2/1984 |
| WO | WO-96/30902 A1 | 10/1996 |
| WO | WO-97/22182 A1 | 6/1997 |
| WO | WO-00/54274 A1 | 9/2000 |
| WO | WO-01/22416 A1 | 3/2001 |
| WO | WO-01/93035 A2 | 12/2001 |
| WO | WO-03/007296 A1 | 1/2003 |
| WO | WO-03/025924 A1 | 3/2003 |
| WO | WO-03/079353 A1 | 9/2003 |
| WO | WO-2004/015707 A1 | 2/2004 |
| WO | WO-2004/015708 A1 | 2/2004 |
| WO | WO-2004/025648 | 3/2004 |
| WO | WO-2004/025649 | 3/2004 |
| WO | WO-2004/029668 A2 | 4/2004 |
| WO | WO-2004/029941 A1 | 4/2004 |
| WO | WO-2004/034396 A1 | 4/2004 |
| WO | WO-2004/036561 A1 | 4/2004 |
| WO | WO-2004/053872 A1 | 6/2004 |
| WO | WO-2004/053874 A1 | 6/2004 |
| WO | WO-2004/068476 A1 | 8/2004 |
| WO | WO-2004-075180 | 9/2004 |
| WO | WO-2004/079631 | 9/2004 |
| WO | WO-2004/079731 A1 | 9/2004 |
| WO | WO-2004/079740 A1 | 9/2004 |
| WO | WO-2004/081926 A1 | 9/2004 |
| WO | WO-2004/093035 A1 | 10/2004 |
| WO | WO-2004/100155 A1 | 11/2004 |
| WO | WO-2004/100156 A1 | 11/2004 |
| WO | WO-2005/004123 A1 | 1/2005 |
| WO | WO-2005/004154 A2 | 1/2005 |

* cited by examiner

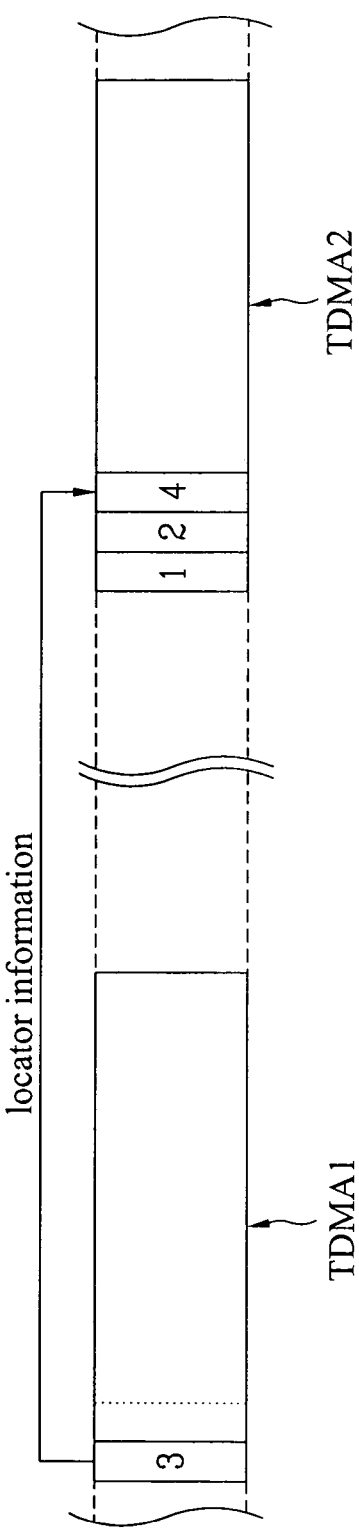

DEFECT MANAGEMENT METHOD FOR OPTICAL RECORDING MEDIUM AND OPTICAL RECORDING MEDIUM USING THE SAME

This application claims the benefit of the Korean Applications No. 10-2003-0011831 filed on Feb. 25, 2003 and No. 10-2003-0023839 filed on Apr. 15, 2003, which are hereby incorporated by reference.

BACKGROUND OF THE INVENTION

1. Field of the Invention

The present invention relates to optical recording media, and more particularly, to a defect management method for an optical recording medium and an optical recording medium using the same, in which a plurality of temporary defect management areas is used for defect management.

2. Discussion of the Related Art

Optical discs are widely used as recording media for storing large amounts of data for long periods of time. Such recording media can be largely divided into two types, including rewritable discs and write-once type discs. In data recording using a write-once type disc, only one write operation can be performed for any given area, while the rewritable disc affords much greater flexibility, particularly in terms of the management of defective areas. A defective area results from a manufacturing flaw in or subsequent damage to the surface of an optical recording medium that precludes recording data on one or more clusters.

If a defective area is found during the recording of data on an optical disc, the data written in the defective area is rewritten on an alternative area assigned by the manufacturer. At the same time, locator information, which is indicative of the defective area and its replacement recording area, is recorded for the defects of a given disc as defect management information in a defect management area (DMA). Thus, data to be recorded on an optical disc may be reproduced even if the disc exhibits defects on the recording surface.

This technique, however, is generally applied to rewritable discs, which allow free access to all data recording areas. Any necessary defect management can therefore be accomplished with a relatively small DMA, which enables high-speed recording. Write-once type discs, on the other hand, require larger DMAs and more complex defect management due to their inherent write function limitations, and as a result, data recording operations typically require much more time.

Meanwhile, a new type of high-density optical recording medium, known as the HD-DVD, has been adopted for recording and storing high-quality audio and video data. An example of an HD-DVD recording medium is the Blu-ray disc, so named due to the use of blue rays (405 nm), which are far denser than the red rays (650 nm) used by conventional DVDs and can therefore store significantly larger amounts of data on standard-sized optical discs. Standardization of this technology is underway, to include standards for a write-once Blu-ray disc (BD-WO) and for a rewritable Blu-ray disc (BD-RE), particularly with regard to the detection and management of defective areas detected during data recording operations.

Importantly, any standardization of defect management for a write-once type disc (e.g., a BD-WO disc) should consider defect management using a rewritable disc (e.g., a BD-RE disc). Thus, the standardization of one should embrace as many common features of the other as possible, to maintain consistency and compatibility while striving for the efficient recording of defect management information to facilitate stable data reproduction operations.

In any event, the management of defective areas is crucial during data recording, particularly for high-density DVDs such as the Blu-ray disc, but current BD-WO standards are inadequate. A unified standard, one that can accommodate the progressive demands of commercial systems for optical data storage, is required.

SUMMARY OF THE INVENTION

Accordingly, the present invention is directed to a defect management method for an optical recording medium, and an optical recording medium using the same, that substantially obviates one or more of the problems due to limitations and disadvantages of the related art.

An object of the present invention, which has been devised to solve the foregoing problem, lies in providing a method and apparatus by which defect management information is recorded on a plurality of temporary defect management areas of an optical recording medium, such as a write-once Blu-ray disc, to include information specifying the location of a last or latest defect management area among the temporary defect management areas, representing the most recently recorded area and therefore containing the most current information.

It is another object of the present invention to provide a defect management method for an optical recording medium, in which recording time is reduced.

It is another object of the present invention to provide a defect management method for an optical recording medium, which facilitates real-time recording.

It is another object of the present invention to provide a unified standard for write-once optical recording media.

It is another object of the present invention to provide such a standard compatible with rewritable optical recording media.

It is another object of the present invention to provide a more efficient method for the management of defective areas during data recording on a write-once optical recording medium.

It is another object of the present invention to provide a method for recording on an optical recording medium in which data security and data integrity is enhanced.

It is another object of the present invention to provide a method for recording management information on an optical recording medium, which enables adaptation to successive versions of the medium.

It is another object of the present invention to provide an optical recording medium for adopting the above methods.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method of defect management for a write-once optical recording medium having a plurality of temporary defect management areas, the method comprising a step of recording disc definition structure information in at least one of the plurality of temporary defect management areas, wherein the disc definition structure information includes continuously updated defect management information and locator information for accessing the continuously updated defect management information. The plurality of temporary defect management areas includes a first temporary defect management area for recording the continuously updated disc management information during a recording session and a second temporary defect management area for recording the continuously updated disc management information upon termination of the recording session.

In another aspect of the present invention, there is provided a write-once optical recording medium having a plurality of temporary defect management areas, wherein defect management information is continuously updated and recorded in at least one of the temporary defect management areas. The continuously updated defect management information is recorded in each temporary defect management area.

The following detailed description is made particularly with respect to a write-once Blu-ray disc. Nevertheless, other write-once type optical recording media may adopt the method and apparatus of the present invention. In addition, though most suited for optical discs using the BD-WO format, the fundamental principles of the present invention may be adopted by optical discs using other formats, for enhanced data security and data integrity. Furthermore, while the embodiments of the present invention are described with respect to a single-layer optical recording medium, the same general disc structure and defect management method is applicable to a dual-layer optical recording medium, in which two primary TDMAs (one for each layer) and as many as three additional TDMAs are used.

It is to be understood that both the foregoing description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2A-2C are diagrams of the TDMAs of FIG. 1, where FIGS. 2A and 2B illustrate the normal operation of the defect management method of the present invention and FIG. 2C illustrates a fail condition;

DETAILED DESCRIPTION OF THE PREFERRED EMBODIMENT

Reference will now be made in detail to the preferred embodiment of the present invention, examples of which are illustrated in the accompanying drawings. Throughout the drawings, like elements are indicated using the same or similar reference designations.

Figure 1:
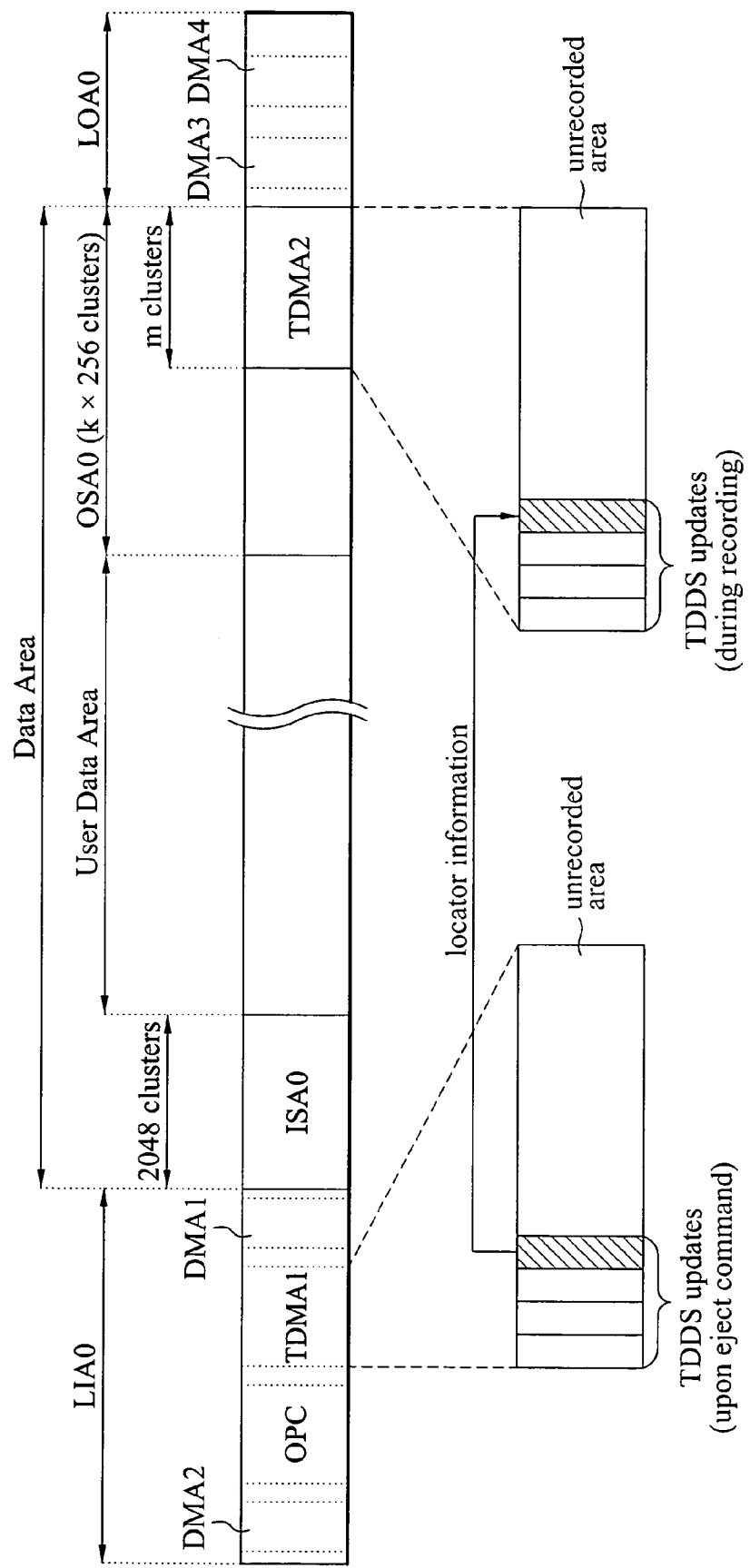
FIG. 1 is a diagram for illustrating a defect management method for an optical recording medium according to the present invention.

FIG. 1 shows a recording area of a write-once optical disc, such as a Blu-ray disc, to illustrate a defect management method for an optical recording medium according to the present invention, wherein defect management information is recorded in a temporary defect management area (TDMA). The optical disc is provided with a plurality of such TDMAs for each layer of an optical recording medium, with each TDMA occupying at least one cluster.

Each TDMA includes temporary disc definition structure (TDDS) information and a temporary defect list or TDFL, which are typically recorded in tandem, but for the purposes of the present invention, specific illustration and discussion of the TDFL has been omitted. In addition to a continuously updated counter, the TDDS information includes locator information (i.e., a physical sector number or PSN) corresponding to the latest (most recent) occurrence of defect management. Thus, the defect management information is recorded and reproduced based on the locator information of the latest defect management. In doing so, the locator information of the latest defect management is recorded in the TDMA recorded as a new field in the form of the first PSN of the last TDDS, to occupy four bytes per field.

In a first preferred embodiment, the locator information may be represented by a single recording to indicate the last-recorded TDDS among all TDMAs. In a second preferred embodiment, the locator information may be represented by plural recordings to indicate the last-recorded TDDS for individual TDMAs. Here, assuming two TDMAs of TDMA1 and TDMA2, the TDDS information would include the first PSN of the last-recorded TDDS of the TDMA1 and the first PSN of the last-recorded TDDS of the TDMA2. In either case, one instance of locator information recording is performed for each instance of defect management and corresponds to the location of the current TDDS.

Meanwhile, the update counter of the TDDS is updated for each instance of TDDS recording, which is performed for each instance of defect management or at desired intervals to conserve recording space in a write-once optical disc. That is, the TDDS may be updated after a predetermined amount of recording, may be updated after the lapse of a predetermined of period since the last update, or may be updated based on a combination of factors, including a disc eject command.

In the preferred embodiment of FIG. 1, the recording area of an optical recording medium is divided into a lead-in area (LIA0), a data area, and a lead-out area (LOA0), the data area includes a user data area and has an inner spare area (ISA0) and an outer spare area (OSA0) assigned at either end. The TDMA2 is provided in the outer spare area, and TDDS updates that occur during recording are recorded in the TDMA2. At the time of a disc eject command, one TDDS update is recorded in the TDMA1, which is provided in the lead-in area.

Generally speaking, recording in the TDMA is accomplished by one of two ways: recording when the TDMA2 is available, i.e., when the TDMA2 is not fully recorded such that an unrecorded area thereof is available for recording, and recording when the TDMA2 is unavailable, i.e., when the TDMA2 is fully recorded already such that no further recording area thereof is available, whereupon defect management is discontinued. If the TDMA2 is unavailable for recording, or if no TDMA2 is provided in the disc, there can be no defect management.

Assuming that the TDMA2 is available, there are in essence two stages of recording: during recording and after recording. During a recording session, the defect management information is recorded in the TDMA2 whenever the TDDS information is to be updated. Then, just before ejecting the disc, a final recording operation is performed, whereby the defect management information that was recorded in the TDMA2 during recording is recorded in the TDMA1.

In recording updated TDDS information in the TDMA1 according to the first preferred embodiment, the locator information of the last defect management in the TDMA2, which represents the current state of continuously updated defect management information, is recorded in the TDMA1 as part of the next TDDS. Included as part of the updated TDDS information recorded in the TDMA1 is the locator information of the last defect management, which points to the current defect management information recorded in the TDMA2. Here, the locator information of the last defect management is the recording location of the previous TDDS, which is identifiable by its update counter. That is, if the value of the update counter in the latest TDDS recorded in the TDMA1 is N, the value of the update counter for the locator information of the last defect management, i.e., the recording location of the last TDDS in the TDMA2, should be N-1. Here, it should be appreciated that the update counter of the TDDS is incremented each time the TDDS is recorded, or updated, in either the TDMA1 and TDMA2.

On the other hand, in cases where the TDMA2 is unavailable for recording, such that no further defect management information can be recorded, the TDMA1 is used to record the defect management information. In such cases, which may include discs having no assigned OSA from the manufacturer and therefore no TDMA2, defect management information can be recorded in a limited manner, for example, only when the disc is in use (during recording) or only when ejected (after recording).

Figure 2A:
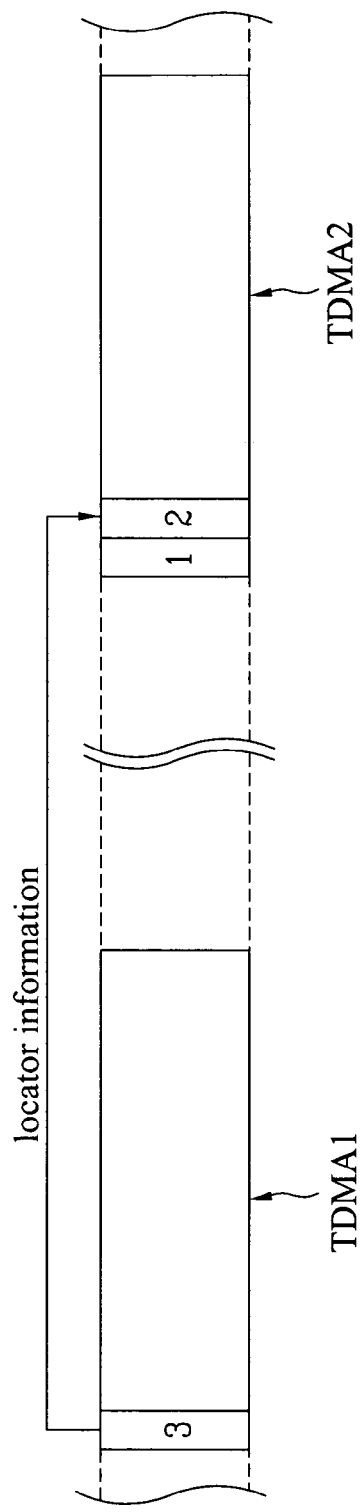
Figure 2B:
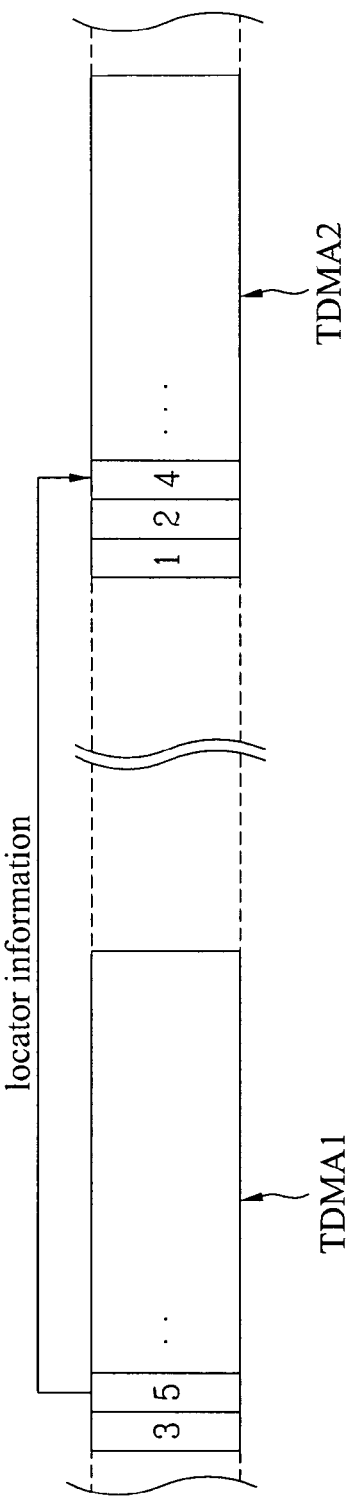

Referring to FIG. 2A, it is assumed that the TDDS information is updated twice during one recording session, to be respectively recorded in the TDMA2 as TDDS1 and TDDS2. Upon generation of a disc eject command, i.e., upon completion of the recording session, the current TDDS information is stored in TDMA1 as TDDS3. Thus, TDDS3 includes the locator information of the latest defect management, and therefore contains the locator information of the last-recorded TDDS of the TDMA2, so that the TDMA1 may be read to locate the current TDDS information. Upon resumption of a next recording session, the TDDS is updated in the TDMA as TDDS4, as shown in FIG. 2B. After a conclusion of recording and at the time of disc ejection, regardless of the number of updates, the next TDDS update is recorded in the TDMA1 as, for example, TDDS5, which contains the locator information for the immediately preceding TDDS, e.g., TDDS4, which would be the most current TDDS.

Here, consecutive numbers refer to consecutive updates of the TDDS. Further recording sessions follow the above model, whereby TDDS updates that occur during recording are recorded in the TDMA2, with a final update being recorded in the TDMA1 just prior to ejecting the disc. Recording fail conditions can thus be recognized by reading the TDMA1, to check the value of the update counter of the last recorded TDDS, and comparing the read value with that of the last recorded TDDS in the TDMA2.

That is, referring to FIG. 2C where the recording of TDDS5 has not been achieved for some reason, for example, a power failure, the value of the update counter of TDDS3, which is the last recorded TDDS of the TDMA1, is less than the value of the update counter of TDDS4, which is the last recorded TDDS of the TDMA2. It should be appreciated that, in normal conditions, the value of the update counter of the last recorded TDDS of the TDMA1 should always be greater than the value of the update counter of the last recorded TDDS of the TDMA2.

Upon recognition of a fail condition, continued recording may proceed normally by dealing with the failure in one of two ways. As one option, the next TDDS, i.e., TDDS5 or "disc eject" TDDS information, may first be recorded as usual in TDMA1, followed by further TDDS updates as necessary in the TDMA2. The information of the next TDDS is known by reading the TDMA to determine the highest update counter value. Since the continuously updated TDDS information always includes the locator information of the previous TDDS, information lost by a premature disc ejection can be restored. As an alternative, continued recording may proceed by simply advancing the recording process, thus skipping the recording of the disc eject TDDS information, to record as necessary the next TDDS in the TDMA2 and perform defect management processing based on the last recorded TDDS of the TMDA2.

Figures 3A, 3B:
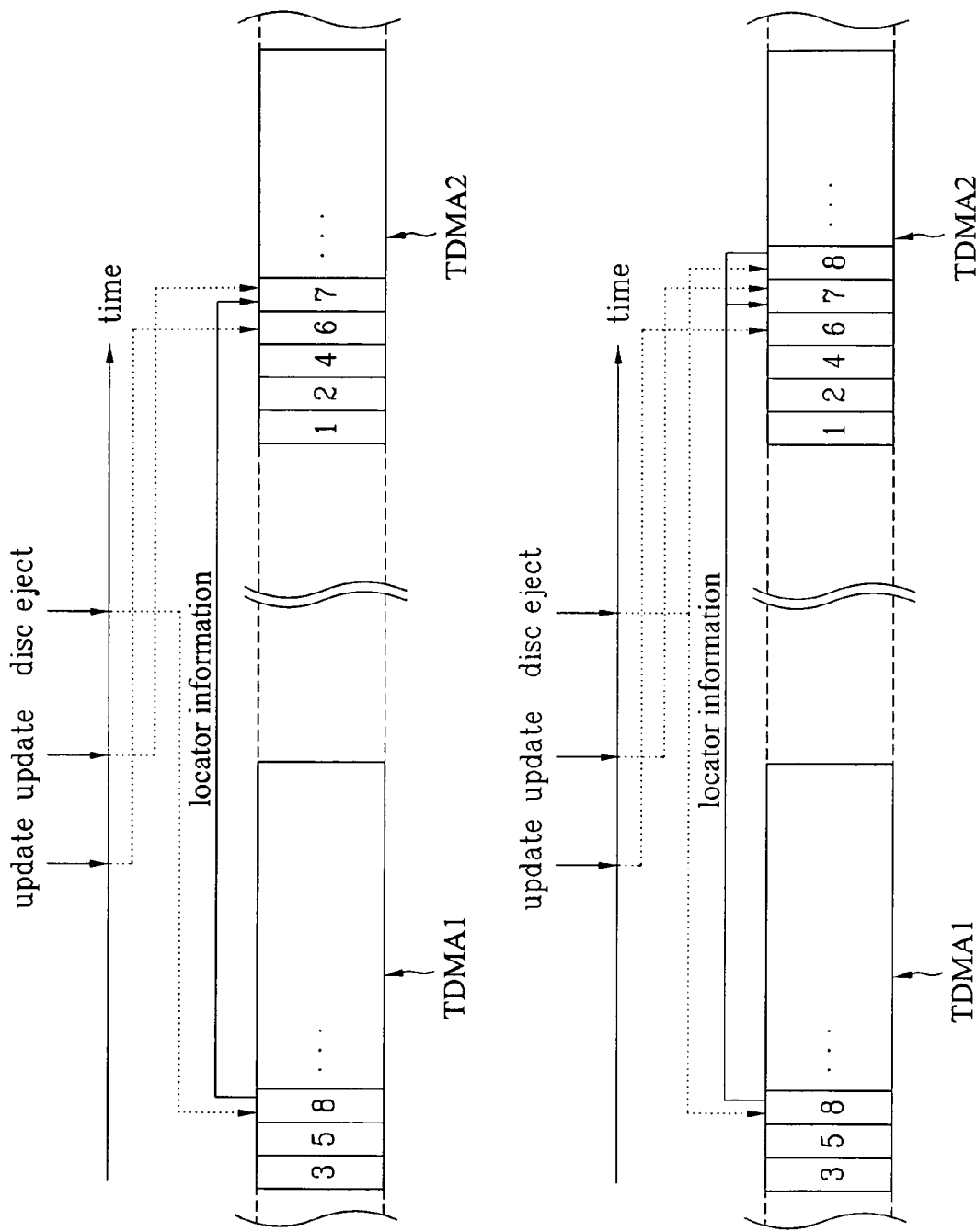
FIGS. 3A and 3B are diagrams of the TDMAs of FIG. 1, illustrating alternatives in recording the defect management information.

FIGS. 3A and 3B illustrative alternatives in recording the disc eject TDDS information. As shown in FIG. 3A, the disc eject TDDS information is recorded in the TDMA1 only, but as shown in FIG. 3B, the disc eject TDDS information is recorded in both TDMAs. In any event, only the last defect management information is recorded when the disc is ejected.

Figure 4:
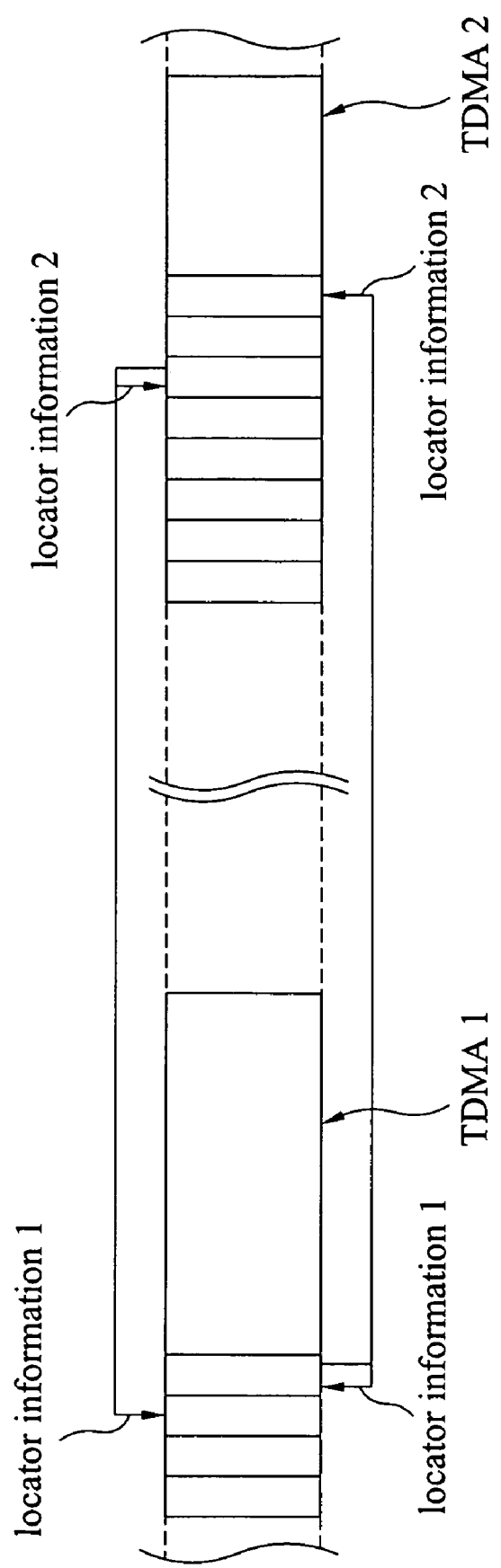
FIG. 4 is a diagram of the TDMAs of FIG. 1, illustrating the recording of defect management information according to another embodiment of the present invention.

In the second embodiment of the present invention to record updated TDDS information, the locator information indicates the recording location of the last defect management in each TDMA, by recording locator information in each. As shown in FIG. 4, the updated TDDS information includes locator information 1 and locator information 2, as access pointers recorded in the TDMA1 and TDMA2, respectively. Thus, each recorded update of the TDDS information includes the locator information of the last defect management area of both TDMAs.

According to the present invention, defect management information is recorded (updated) in one of two temporary defect management areas, with disc-in-use defect management information being recorded in one TDMA, i.e., while the disc is in use, and disc-eject defect management information being recorded in another TDMA. Thus, the last defect management information of an in-use disc is recorded when the disc is ejected. As an alternative for cases where a second TDMA is unavailable, only the disc-in-use defect management information is recorded in a TDMA, and upon ejection, the latest defect management information is also recorded in a TDMA. In either case, a failure to record the last defect management can be recognized on the basis of the update-counter value when the use of the disc is resumed. Likewise, a successful recording of the latest defect management information can also be recognized and confirmed.

Also, the locator information of the last defect management in either TDMA can be used access the current TDDS information using one or two pointers, i.e., according to the first and second embodiments, respectively. On the other hand, the locator information of the last TDDS recorded in the TDMA1 is set to a value of "0h" when there is no spare area allocated for defect management and is set to a value of "Fh" when the TDMA2 is full such that continued defect management becomes impossible.

It will be apparent to those skilled in the art that various modifications and variations can be made in the present invention without departing from the spirit or scope of the invention. Thus, it is intended that the present invention cover such modifications and variations provided they come within the scope of the appended claims and their equivalents.

What is claimed is:

1. A method of defect management for an optical recording medium having a plurality of temporary defect management areas, the method comprising a step of recording temporary defect management information in the plurality of temporary defect management areas, comprising recording, in a first temporary defect management area, first temporary defect management information generated when recording to the recording medium, and recording, in a second temporary defect management area, second temporary defect management information generated in response to an eject signal, wherein the first and second temporary defect management areas are separately located in the recording medium, wherein the step of recording temporary defect management information includes recording disc definition structure information, the disc definition structure information including locator information pointing to an address of latest disc definition structure information recorded in each of the plurality of temporary defect management areas.

2. A method of defect management for an optical recording medium having a plurality of temporary defect management areas, the method comprising a step of recording temporary defect management information in the plurality of temporary defect management areas, comprising recording, in a first temporary defect management area, first temporary defect management information generated when recording to the recording medium, and recording, in a second temporary defect management area, second temporary defect management information generated in response to an eject signal, wherein the first and second temporary defect management areas are separately located in the recording medium, wherein the step of recording temporary defect management information includes recording disc definition structure information including a counter having a value that is updated for each recording of the disc definition structure information the step of recording disc definition structure information including recording disc definition structure information of a recording session in the second temporary defect management area, the method further comprising a step of performing defect management immediately following the recording of the disc definition structure information of the recording session in the second temporary defect management area if a highest counter value recorded in the second temporary defect management area is less than a highest counter value recorded in the first temporary defect management area.

3. A method of defect management for an optical recording medium having a plurality of temporary defect management areas, the method comprising a step of recording temporary defect management information in the plurality of temporary defect management areas, comprising recording, in a first temporary defect management area, first temporary defect management information generated when recording to the recording medium, and recording, in a second temporary defect management area, second temporary defect management information generated in response to an eject signal.

wherein the first and second temporary defect management areas are separately located in the recording medium wherein the step of recording temporary defect management information includes recording disc definition structure information including a counter having a value that is updated for each recording of the disc definition structure information, the step of recording disc definition structure information including recording disc definition structure information of the recording session in the second temporary defect management area, the method further comprising a step of performing defect management immediately preceding the recording of the disc definition structure information of a recording session in the second temporary defect management area if a highest counter value recorded in the second temporary defect management area is less than a highest counter value in the first temporary defect management area.

4. An optical recording medium having a plurality of temporary defect management areas for recording temporary defect management information, the plurality of temporary defect management areas comprising:

a first temporary defect management area containing first temporary defect management information generated when recording the recording medium; and a second temporary defect management area containing second temporary defect management information generated in response to an eject signal.

wherein the first and second temporary defect management areas are separately located in the recording medium.

wherein the temporary defect management information includes disc definition structure information, the disc definition structure information including locator information pointing to an address of latest disc definition structure information recorded in each of the plurality of temporary defect management areas.

5. An optical recording medium having a plurality of temporary defect management areas for recording temporary defect management information, the plurality of temporary defect management areas comprising:

a first temporary defect management area containing first temporary defect management information generated when recording the recording medium; and a second temporary defect management area containing second temporary defect management information generated in response to an eject signal, wherein the first and second temporary defect management areas are separately located in the recording medium, wherein the temporary defect management information includes disc definition structure information including a counter having a value that is undated for each recording of the disc definition structure information and if a highest counter value recorded in the second temporary defect management area is less than a highest counter value recorded in the first temporary defect management area, the recording medium is configured to enable defect management to be performed immediately following a recording of the disc definition structure information in the second temporary defect management area, the disc definition structure information corresponding to a recording session.

6. An optical recording medium having a plurality of temporary defect management areas for recording temporary defect management information, the plurality of temporary defect management areas comprising:

a first temporary defect management area containing first temporary defect management information generated when recording the recording medium; and a second temporary defect management area containing second temporary defect management information generated in response to an eject signal.

wherein the first and second temporary defect management areas are separately located in the recording medium, wherein the temporary defect management information includes disc definition structure information including a counter having a value that is updated for each recording- of the disc definition structure information and if a highest counter value recorded in the, second temporary defect management area is less than a highest counter value recorded in the first temporary defect management area, the recording medium is configured to enable defect management to be performed immediately preceding a recording of the disc definition structure information of a recording session in the second temporary defect management area.

* * * * *